(12) United States Patent
Murata et al.

(10) Patent No.: US 10,355,293 B2
(45) Date of Patent: Jul. 16, 2019

(54) FUEL CELL VEHICLE

(71) Applicant: TOYOTA JIDOSHA KABUSHIKI KAISHA, Toyota-shi, Aichi-ken (JP)

(72) Inventors: Shigeaki Murata, Nisshin (JP); Takanori Otsura, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/003,482

(22) Filed: Jun. 8, 2018

(65) Prior Publication Data
US 2018/0366746 A1  Dec. 20, 2018

(30) Foreign Application Priority Data
Jun. 16, 2017 (JP) .................... 2017-118213

(51) Int. Cl.
*H01M 8/04119* (2016.01)
*B60L 50/72* (2019.01)
*H01M 8/04082* (2016.01)
*B60L 50/71* (2019.01)

(52) U.S. Cl.
CPC ......... *H01M 8/04156* (2013.01); *B60L 50/71* (2019.02); *B60L 50/72* (2019.02); *H01M 8/04201* (2013.01); *H01M 2250/20* (2013.01)

(58) Field of Classification Search
CPC ............................................. H01M 8/04156
See application file for complete search history.

(56) References Cited

U.S. PATENT DOCUMENTS

| | | | | |
|---|---|---|---|---|
| 5,641,031 A | * | 6/1997 | Riemer | B60K 1/04 180/68.5 |
| 2002/0061426 A1 | * | 5/2002 | Imaseki | H01M 8/04029 429/413 |
| 2003/0000758 A1 | * | 1/2003 | Bruck | B60K 28/14 180/279 |
| 2006/0024542 A1 | * | 2/2006 | Uozumi | B60K 1/04 180/65.31 |
| 2006/0068240 A1 | * | 3/2006 | Matoba | H01M 8/04029 429/414 |

(Continued)

FOREIGN PATENT DOCUMENTS

| | | |
|---|---|---|
| JP | 2014-151805 A | 8/2014 |
| JP | 2015-209043 A | 11/2015 |

*Primary Examiner* — Erez Gurari
(74) *Attorney, Agent, or Firm* — Dickinson Wright, PLLC (57) ABSTRACT

There is provided a fuel cell vehicle equipped with a fuel cell. The fuel cell vehicle comprises a fuel gas supply piping located in floor of the fuel cell vehicle and configured to supply a fuel gas to the fuel cell; an exhaust drainage piping located under the floor and configured to discharge an exhaust gas and water from the fuel cell; a muffler located below the fuel gas supply piping in a direction of gravity and connected with the exhaust drainage piping; and an undercover located below the muffler and provided to cover the floor, the undercover having a gap along a front-rear direction of the fuel cell vehicle formed between a front wheel of the fuel cell vehicle. The muffler is placed on any straight line that passes through the fuel gas supply pipe and that connects any point of a contact area in which the front wheel is in contact with ground surface with the gap in a view of a left-right direction of the fuel cell vehicle.

4 Claims, 11 Drawing Sheets

(56) References Cited

U.S. PATENT DOCUMENTS

| | | | |
|---|---|---|---|
| 2006/0113131 A1* | 6/2006 | Kato | B60K 1/04 429/434 |
| 2007/0007060 A1* | 1/2007 | Ono | B60K 1/04 180/65.31 |
| 2007/0065696 A1* | 3/2007 | Fukuma | H01M 8/04089 429/413 |
| 2007/0122669 A1* | 5/2007 | Kusano | B60L 11/1881 429/414 |
| 2009/0317692 A1* | 12/2009 | Matsumoto | B60K 11/06 429/415 |
| 2010/0112387 A1* | 5/2010 | Nagasawa | B60L 3/00 429/413 |
| 2012/0006607 A1* | 1/2012 | Ohashi | B60K 1/04 180/65.31 |
| 2012/0080251 A1* | 4/2012 | Ohashi | B60K 1/04 180/65.31 |
| 2012/0181098 A1* | 7/2012 | Masaki | B60K 11/02 180/65.31 |
| 2013/0139997 A1* | 6/2013 | Murakami | B60K 11/06 165/41 |
| 2014/0020968 A1* | 1/2014 | Ikeya | B60K 1/04 180/65.31 |
| 2014/0335434 A1* | 11/2014 | Ikeya | B60L 1/003 429/435 |
| 2015/0251560 A1* | 9/2015 | Ishikawa | B62D 21/15 180/232 |
| 2016/0221433 A1* | 8/2016 | Akaboshi | B60K 1/04 |
| 2017/0066479 A1* | 3/2017 | Murata | B60K 1/04 |
| 2017/0096172 A1* | 4/2017 | Nagaosa | H01M 8/04201 |
| 2017/0282709 A1* | 10/2017 | Sasaki | B60K 15/03006 |
| 2018/0205106 A1* | 7/2018 | Murata | B60L 11/1898 |
| 2018/0272863 A1* | 9/2018 | Otsura | B60K 13/04 |
| 2018/0354558 A1* | 12/2018 | Otsura | B60K 13/04 |
| 2018/0366746 A1* | 12/2018 | Murata | B60L 11/1883 |
| 2019/0013530 A1* | 1/2019 | Becker | F28F 17/005 |

* cited by examiner

FUEL CELL VEHICLE

CROSS-REFERENCE TO RELATED APPLICATION

The present application claims priority to Japanese Patent Application No. 2017-118213 filed on Jun. 16, 2017, the contents of which are incorporated herein by reference.

BACKGROUND

Field

The present disclosure relates to a fuel cell vehicle.

Related Art

A conventionally known fuel cell vehicle includes a fuel gas supply piping supplying a fuel gas to a fuel cell and an exhaust drainage piping discharging an exhaust gas and drainage water from the fuel cell to outside. In a known fuel cell vehicle, the exhaust drainage piping is placed below the fuel gas supply piping, in order to protect the fuel gas supply piping from an object such as stone raised by a wheel of the vehicle (as described in, for example, JP 2014-151805A).

SUMMARY

The technique disclosed in JP 2014-151805A, however, fails to sufficiently protect the fuel gas supply piping. For example, even when an undercover is provided in a lower portion of the vehicle, an object such as stone raised by a wheel of the fuel cell vehicle is likely to enter from a gap between the wheel and the undercover and hit against and thereby deform the fuel gas supply pipe.

In order to solve the problem described above, the present disclosure may be implemented by aspects described below.

According to one aspect of the present disclosure, there is provided a fuel cell vehicle. This fuel cell vehicle is equipped with a fuel cell and comprises a fuel gas supply piping located under a floor of the fuel cell vehicle and configured to supply a fuel gas to the fuel cell; an exhaust drainage piping located under the floor and configured to discharge an exhaust gas and water from the fuel cell; a muffler located below the fuel gas supply piping in a direction of gravity and connected with the exhaust drainage piping; and an undercover located below the muffler and provided to cover the floor, the undercover having a gap along a front-rear direction of the fuel cell vehicle formed between a front wheel of the fuel cell vehicle. The muffler is placed on any straight line that passes through the fuel gas supply pipe and that connects any point of a contact area in which the front wheel is in contact with ground surface with the gap in a view of a left-right direction of the fuel cell vehicle. In the fuel cell vehicle of this aspect, even when an object such as stone raised by the front wheel of the vehicle enters from the gap between the front wheel and the undercover, the muffler placed in the moving direction of the object suppresses the entering object from hitting against the fuel gas supply piping.

DETAILED DESCRIPTION

A. First Embodiment

Figure 1:
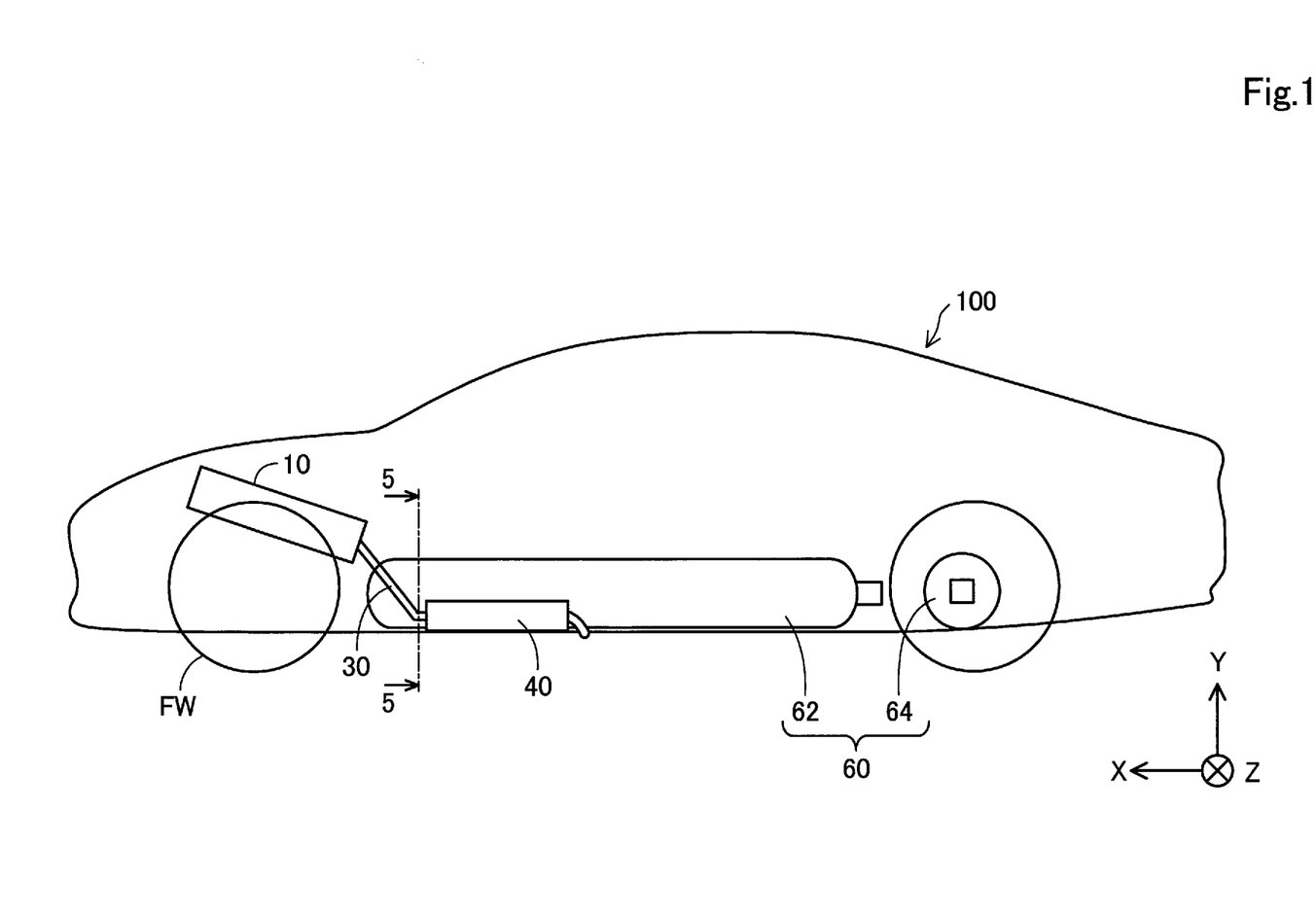
FIG. 1 is a schematic diagram illustrating a fuel cell vehicle according to one embodiment of the disclosure.

FIG. 1 is a schematic diagram illustrating a fuel cell vehicle 100 according to one embodiment of the disclosure. In the description hereof, the expressions relating to the directions of the fuel cell vehicle 100 ("right", "left", "front", "rear", "upper" and "lower") denote directions on the basis of the driver who rides on the fuel cell vehicle 100. In FIG. 1, a positive X-axis direction indicates forward of the vehicle, a positive Y-axis direction indicates upward in the direction of gravity, and a positive Z-axis direction indicates rightward of the vehicle. More specifically, an X-axis direction indicates a front-rear direction of the vehicle, a Y-axis direction indicates the direction of gravity, and a Z-axis direction indicates a width direction of the vehicle. The same applies to XYZ axes in subsequent drawings.

Figure 2:
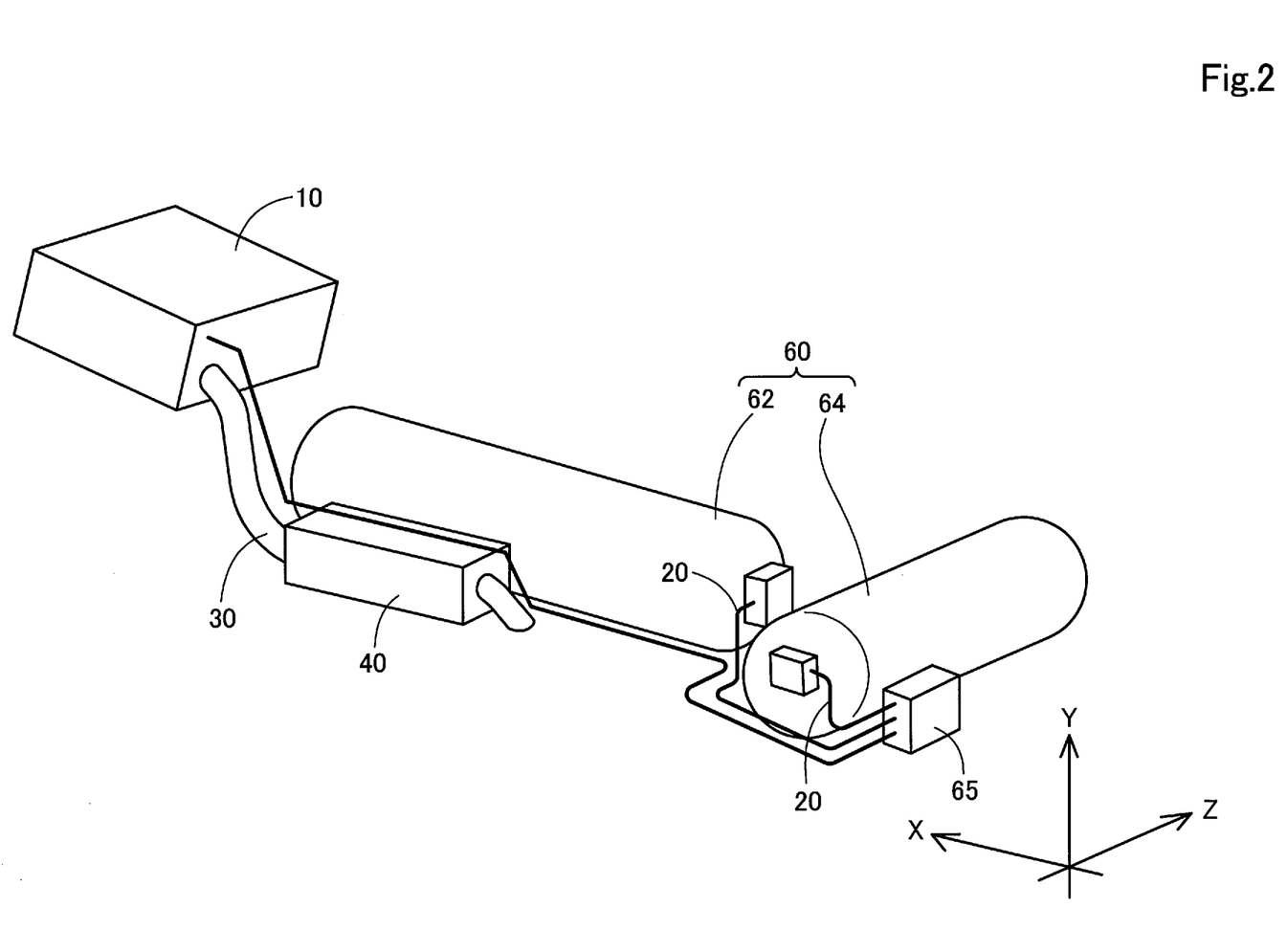
FIG. 2 is a diagram illustrating a positional relationship of a fuel cell and others in the fuel cell vehicle.

FIG. 2 is a diagram illustrating a positional relationship of a fuel cell 10 and others in the fuel cell vehicle 100. As shown in FIG. 1 and FIG. 2, the fuel cell vehicle 100 includes a fuel cell stack (hereinafter simply referred to as "fuel cell") 10, a fuel gas supply piping 20, an exhaust drainage piping 30, a muffler 40, and a hydrogen tank 60. According to the embodiment, the fuel gas supply piping 20, the exhaust drainage piping 30, the muffler 40 and the hydrogen tank 60 are all placed under a floor of the vehicle. More specifically, the fuel gas supply piping 20, the exhaust drainage piping 30, the muffler 40 and the hydrogen tank 60 are placed below an underbody that constitutes a floor of the fuel cell vehicle 100.

The fuel cell 10 is configured by stacking power generation modules, each including a membrane electrode assembly (MEA) formed by joining two electrodes, i.e., an anode and a cathode, with respective sides of electrolyte membrane. The fuel cell 10 generates electric power by an electrochemical reaction of hydrogen supplied as a fuel gas from the fuel gas supply piping 20 with oxygen supplied as an oxidizing gas from an oxidizing gas supply piping (not shown). According to the embodiment, the fuel cell 10 is placed in a front compartment that is located in a front portion of the fuel cell vehicle 100.

The hydrogen tank 60 is a tank filled with hydrogen gas. According to the embodiment, the hydrogen tank 60 includes a first hydrogen tank 62 placed in the middle of the fuel cell vehicle 100 and a second hydrogen tank 64 placed in a rear portion of the fuel cell vehicle 100. According to the embodiment, the first hydrogen tank 62 is arranged along the front-rear direction of the vehicle (X-axis direction), and the second hydrogen tank 64 is arranged along the width direction of the vehicle (Z-axis direction).

The fuel gas supply piping 20 is a piping serving to supply the fuel gas (hydrogen) to the fuel cell 10. The fuel gas supply piping 20 is a piping arranged to connect the hydrogen tank 60 with the fuel cell 10. According to the embodiment, hydrogen supplied from the hydrogen tank 60 is subjected to pressure reduction by a pressure reducing valve 65 provided in the fuel gas supply piping 20 and is then supplied to the fuel cell 10.

The exhaust drainage piping 30 is a piping serving to discharge an exhaust gas including, for example, a gas generated by the electrochemical reaction of the fuel cell 10 and to discharge water generated by the electrochemical reaction of the fuel cell 10. The exhaust gas includes oxygen and hydrogen. The exhaust drainage piping 30 is a piping arranged to connect the fuel cell 10 with the muffler 40. The muffler 40 is a device serving to reduce the noise generated when the exhaust gas is discharged to outside. According to the embodiment, the fuel gas supply piping 20, the exhaust drainage piping 30 and the muffler 40 are provided on a left side of the vehicle (on a −Z-axis direction side).

Figure 3:
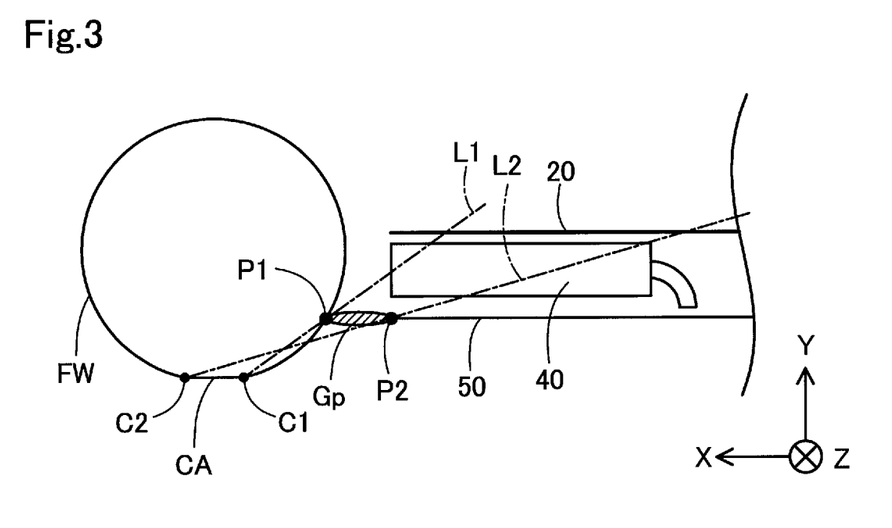
FIG. 3 is a diagram illustrating the configuration in the periphery of a muffler viewed from a left side of the vehicle.

FIG. 3 is a diagram illustrating the configuration in the periphery of the muffler 40 viewed from a left side of the vehicle (from the −Z-axis direction side). As shown in FIG. 3, the muffler 40 is provided below the fuel gas supply piping 20 in the direction of gravity (Y-axis direction). An undercover 50 is provided below the muffler 40 to cover the floor of the vehicle. As shown in FIG. 3, a gap Gp along the front-rear direction (X-axis direction) is formed between each front wheel FW of the fuel cell vehicle 100 and the undercover 50.

Figure 4:
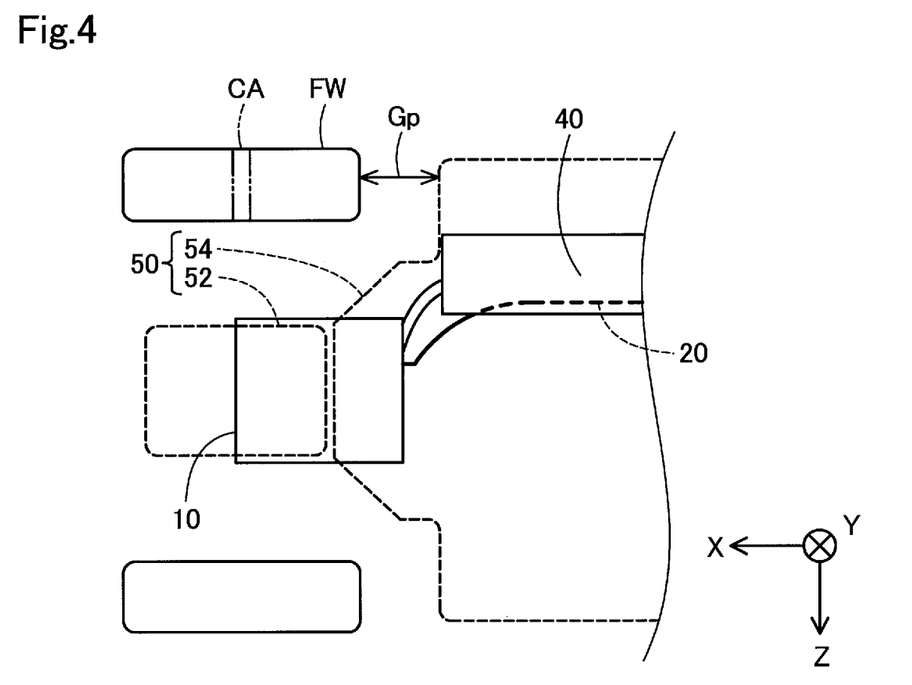
FIG. 4 is a diagram illustrating the configuration in the periphery of the muffler viewed from a lower side of the vehicle.

FIG. 4 is a diagram illustrating the configuration in the periphery of the muffler 40 viewed from a lower side of the vehicle (from the −Y-axis direction side). According to the embodiment, the undercover 50 includes a front undercover 52 provided in a front portion of the vehicle and a floor undercover 54 provided in the middle of the vehicle. According to the embodiment, the front undercover 52 is arranged to cover part of a lower face of the fuel cell 10, and the floor undercover 54 is arranged to cover part of the hydrogen tank 60. According to the embodiment, the gap Gp denotes a gap between the front wheel FW and the floor undercover 52.

As shown in FIG. 3, when being viewed in the left-right direction of the fuel cell vehicle 100 (in the Z-axis direction), the muffler 40 is placed on any straight line that passes through the fuel gas supply piping 20 and that connects the gap Gp with any point of a contact area CA in which the front wheel FW is in contact with the ground surface. More specifically, the muffler 40 is placed on a straight line L1 that connects a rearmost point C1 of the contact area CA with a foremost point P1 of the gap Gp and passes through the fuel gas supply pipe 20. In other words, the straight line L1 passes through the point C1 of the contact area CA, the point P1 of the gap Gp, the muffler 40 and the fuel gas supply piping 20 in this sequence. The muffler 40 is also placed on a straight line L2 that connects a foremost point C2 of the contact area CA with a rearmost point P2 of the gap Gp and passes through the fuel gas supply pipe 20. In other words, the straight line L2 passes through the point C2 of the contact area CA, the point P2 of the gap Gp, the muffler 40 and the fuel gas supply piping 20 in this sequence.

According to the embodiment, when being viewed in the left-right direction of the fuel cell vehicle 100 (in the Z-axis direction), the muffler 40 is placed on any straight line that passes through the fuel gas supply piping 20 and that connects the gap Gp with any point of a contact area CA in which the front wheel FW is in contact with the ground surface. Even when an object such as stone raised by the front wheel FW of the vehicle enters from the gap Gp between the front wheel FW and the undercover 50, the muffler 40 placed in the moving direction of the object suppresses the entering object from hitting against the fuel gas supply piping 20.

B. Second Embodiment

A fuel cell vehicle 200 of a second embodiment differs from the fuel cell vehicle 100 of the first embodiment by addition of reinforcements 85 but otherwise has a similar configuration.

Figure 5:
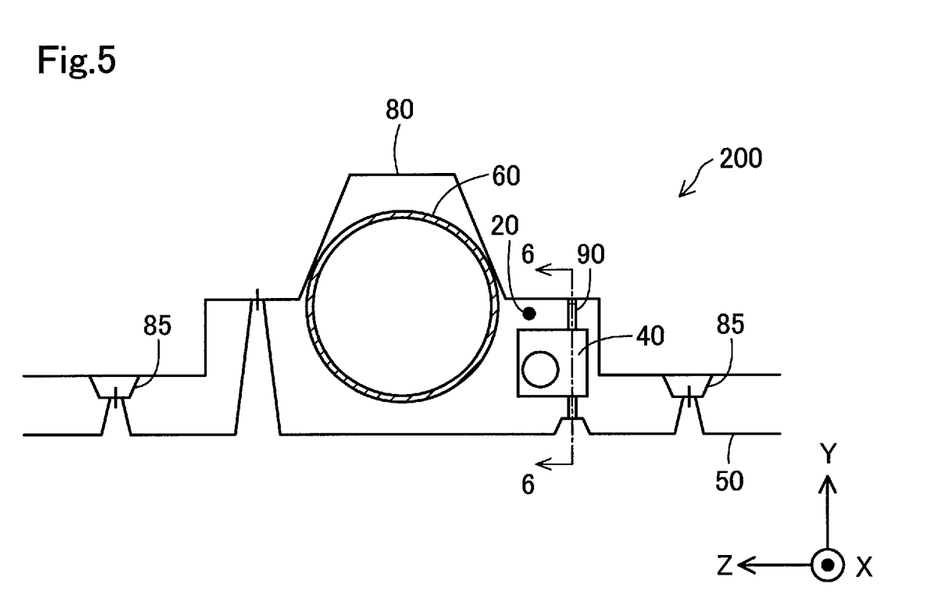
FIG. 5 is a schematic sectional view illustrating a fuel cell vehicle, taken along a 5-5 line in FIG. 1.

FIG. 5 is a schematic sectional diagram illustrating the fuel cell vehicle 200, taken along a 5-5 line in FIG. 1. The reinforcements 85 are members placed under a floor of the fuel cell vehicle 200 to enhance the intensity of the fuel cell vehicle 200. According to the embodiment, the reinforcements 85 are extended along the front-rear direction of the vehicle (X-axis direction). According to the embodiment, the reinforcements 85 are welded to a lower face of an underbody 80.

According to the second embodiment, a fuel gas supply piping 20 is located above lower ends of the reinforcements 85 in the direction of gravity (Y-axis direction). Even when the fuel cell vehicle 200 receives an impact from below, this configuration causes the reinforcements 85 to absorb the impact and thereby suppresses the fuel gas supply piping 20 from being deformed.

As shown in FIG. 5, the underbody 80 and an undercover 50 are directly or indirectly fastened to each other on inner sides of the reinforcements 85 in the left-right direction of the vehicle (Z-axis direction). More specifically, the underbody 80 and the undercover 50 are directly fastened to each other on the right side of the vehicle (on the +Z-axis direction side). The underbody 80 and the undercover 50 are fastened to each other via a penetration collar 90 that is a tubular metal member on the left side of the vehicle (on the −Z-axis direction side).

Figure 6:
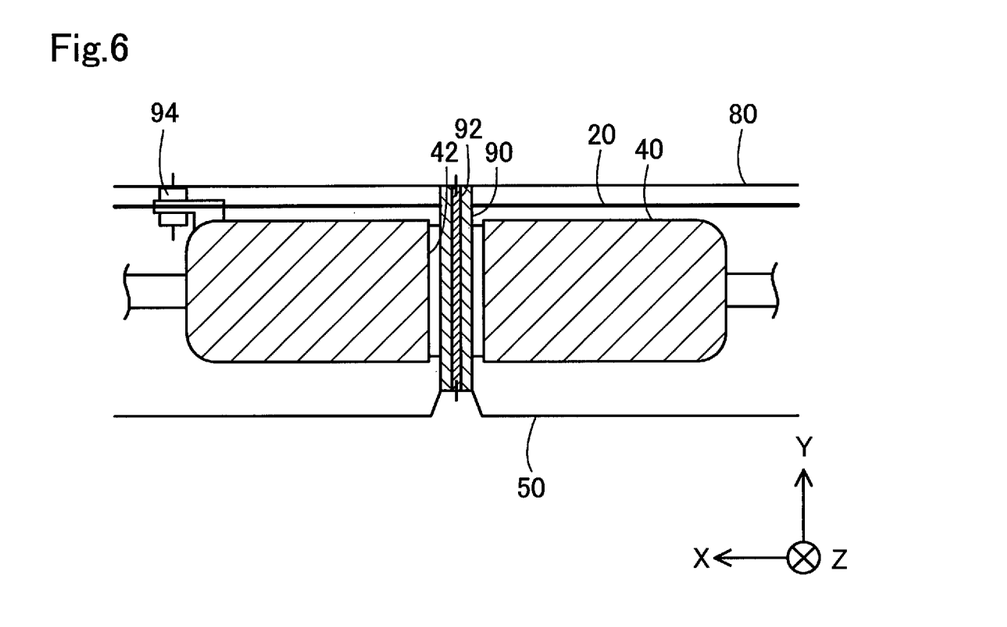
FIG. 6 is a sectional diagram illustrating a fastening structure of an underbody with an undercover.
Figure 7:
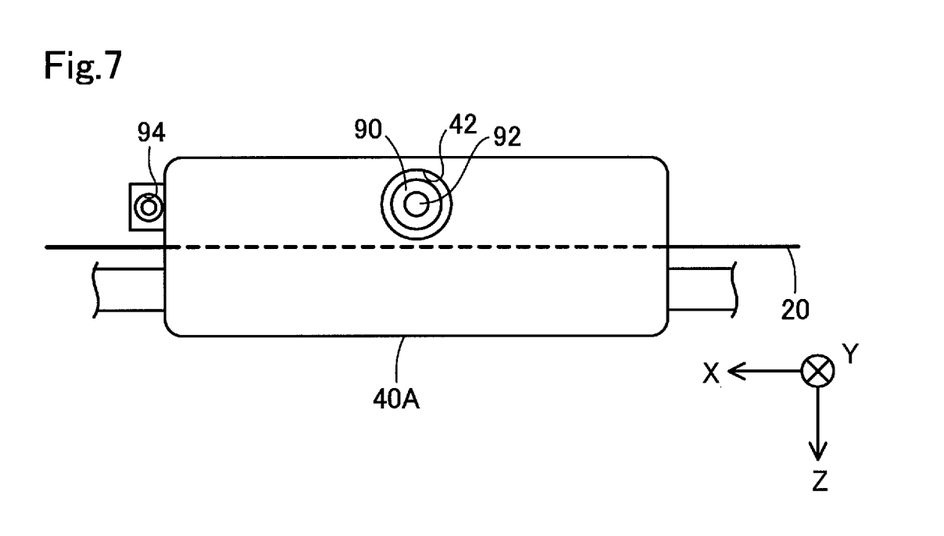
FIG. 7 is a diagram illustrating the configuration in the periphery of a muffler viewed from the lower side of the vehicle.

FIG. 6 is a sectional diagram illustrating fastening of the underbody 80 with the undercover 50 via the penetration collar 90. FIG. 6 illustrates a section taken along a 6-6 line in FIG. 5. FIG. 7 is a diagram illustrating the configuration in the periphery of a muffler 40 viewed from the lower side of the vehicle (from the −Y-axis direction side). The muffler 40 has a through hole 42 that is pierced along the direction of gravity (Y-axis direction). An inner wall of the through hole 42 and an outer wall of the muffler 40 are made of an identical material. The penetration collar 90 is placed in the through hole 42, and a bolt 92 is placed inside of the penetration collar 90. The underbody 80 and the undercover 50 are fastened to each other by means of the bolt 92. This configuration causes the undercover 50 and the underbody 80 to be securely fastened to each other.

A tubular elastic member is provided between the through hole 42 and the penetration collar 90, although not being illustrated. The muffler 40 is fastened to the underbody 80 via an elastic member 94. This configuration suppresses the vibration of the muffler 40 from being transmitted to the undercover 50 and the underbody 80. In general, in a vehicle with the hydrogen tank 60 mounted thereon, the muffler 40, the exhaust drainage piping 30, the fuel gas supply piping 20 and the respective fastening locations of these members are placed in a narrow area near to the hydrogen tank 60. This causes a difficulty in securing the capacity for the muffler 40. The embodiment, however, employs the configuration that the underbody 80 and the undercover 50 are fastened to each other via the penetration collar 90 that is provided inside of the through hole 42 of the muffler 40. This configuration secures the capacity for the muffler 40.

C. Third Embodiment

A third embodiment differs from the second embodiment by a mounting structure of a muffler 40A but otherwise has a similar configuration.

Figure 8:
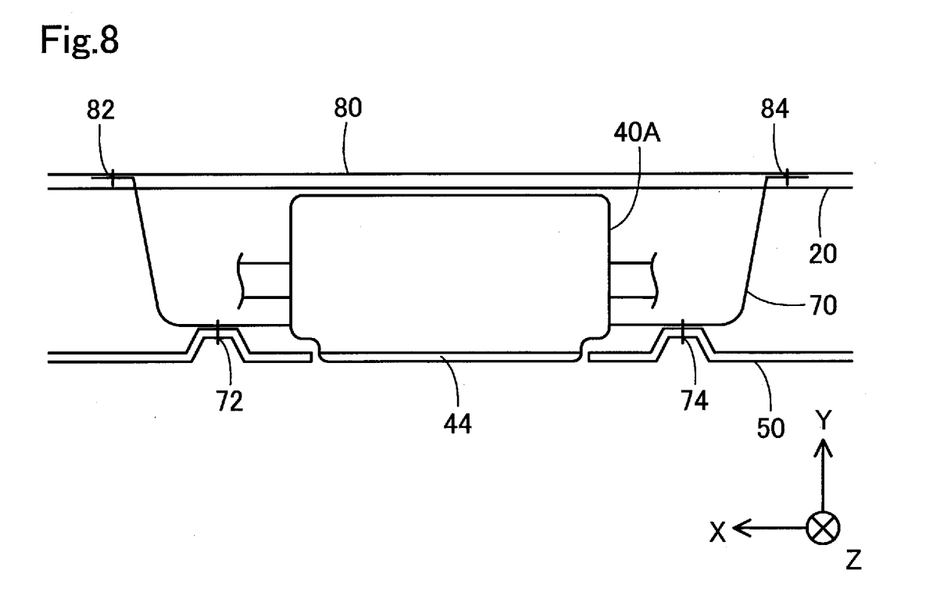
FIG. 8 is a sectional view illustrating a mounting structure of a muffler according to a third embodiment.
Figure 9:
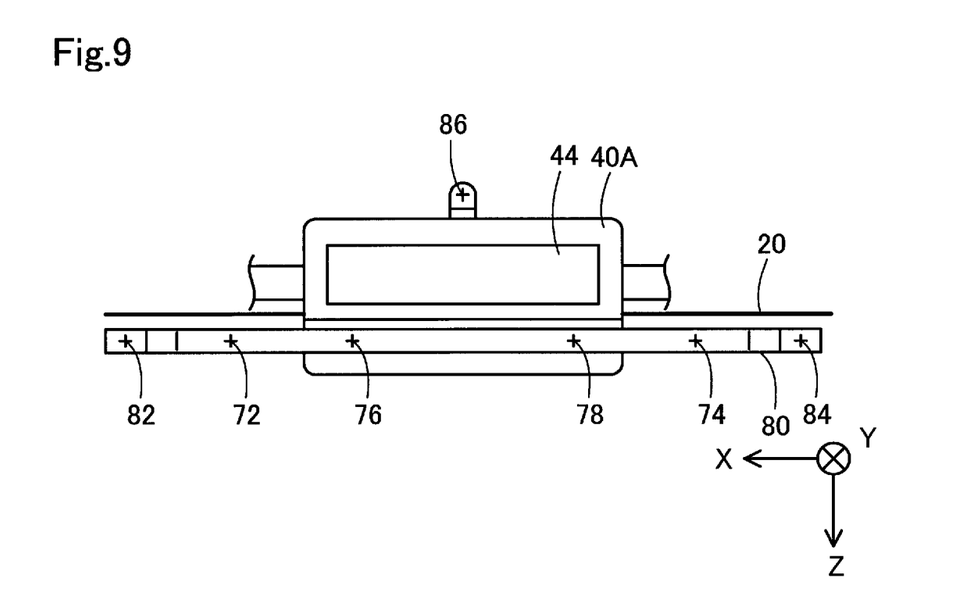
FIG. 9 is a diagram illustrating the configuration in the periphery of the muffler according to the third embodiment viewed from the lower side of the vehicle.

FIG. 8 is a sectional diagram illustrating the mounting structure of the muffler 40A according to the third embodiment. FIG. 9 is a diagram illustrating the configuration in the periphery of the muffler 40A according to the third embodiment viewed from the lower side of the vehicle (from the −Y-axis direction side). According to the third embodiment, the muffler 40A is fastened to an underbody 80 and an undercover 50 via a bracket 70 that is a plate-like member folded downward in the middle thereof. More specifically, as shown in FIG. 9, the bracket 70 is fastened to an upward recessed portion of the muffler 40A at two fastening locations 76 and 78. As shown in FIG. 8, the bracket 70 is fastened to the undercover 50 at two fastening locations 72 and 74 and is fastened to the underbody 80 at two fastening locations 82 and 84. The muffler 40A is fastened to the underbody 80 at one fastening location 86. According to the embodiment, a bottom face 44 of the muffler 40A is formed to be flush with the undercover 50. This configuration secures the capacity for the muffler 40A.

D. Fourth Embodiment

A fourth embodiment differs from the third embodiment by a mounting structure of a muffler 40B but otherwise has a similar configuration.

Figure 10:
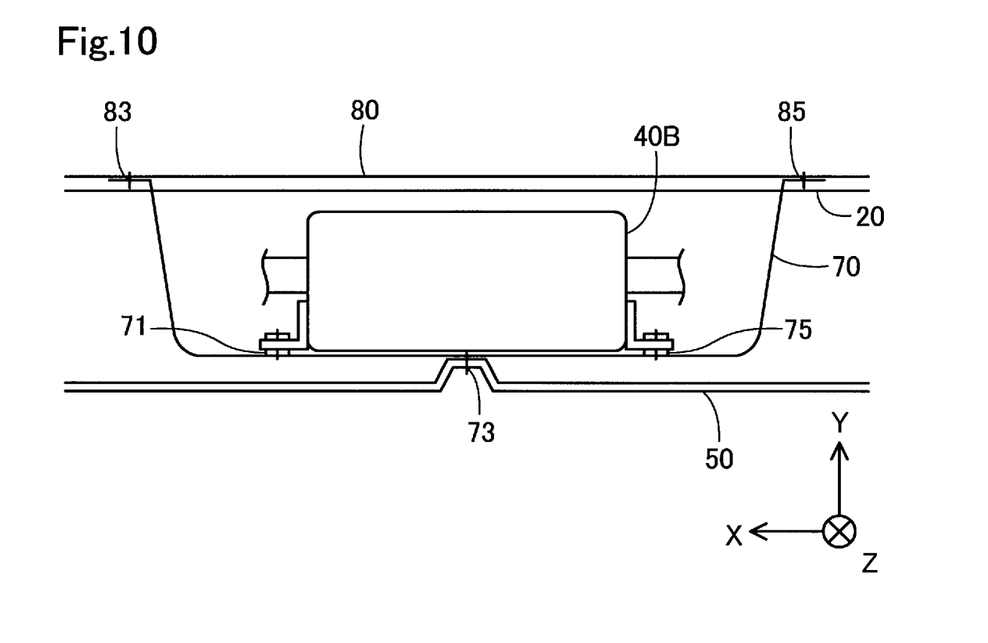
FIG. 10 is a sectional view illustrating a mounting structure of a muffler according to a fourth embodiment.
Figure 11:
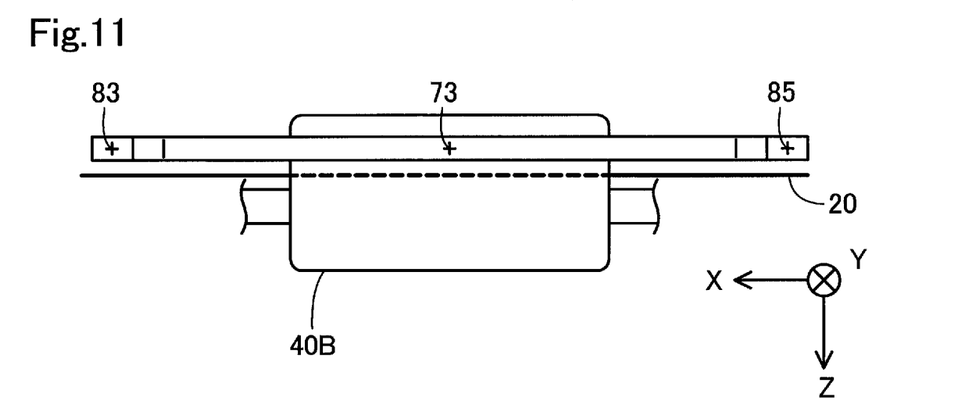
FIG. 11 is a diagram illustrating the configuration in the periphery of the muffler according to the fourth embodiment viewed from the lower side of the vehicle.

FIG. 10 is a sectional diagram illustrating the mounting structure of the muffler 40B. FIG. 11 is a diagram illustrating the configuration in the periphery of the muffler 40B according to the fourth embodiment viewed from the lower side of the vehicle (from the −Y-axis direction side). According to the fourth embodiment, the muffler 40B is fastened to an underbody 80 and an undercover 50 via a bracket 70 that is a plate-like member folded downward in the middle thereof. More specifically, the bracket 70 is fastened to the muffler 40B at two fastening locations 71 and 75. This configuration suppresses the vibration of the muffler 40B from being transmitted to the bracket 70. The bracket 70 is fastened to the undercover 50 at one fastening location 73 and is fastened to the underbody 80 at two fastening locations 83 and 85.

According to the embodiment, the muffler 40B is fastened to the undercover 50 via the bracket 70. This configuration secures the route of the fuel gas supply piping 20.

The disclosure is not limited to any of the embodiments described above but may be implemented by a diversity of other configurations without departing from the scope of the disclosure. Any of the technical features may be omitted appropriately unless the technical feature is described as essential in the description hereof. The present disclosure may be implemented by aspects described below.

(1) According to one aspect of the present disclosure, there is provided a fuel cell vehicle. This fuel cell vehicle is equipped with a fuel cell and comprises a fuel gas supply piping located under a floor of the fuel cell vehicle and configured to supply a fuel gas to the fuel cell; an exhaust drainage piping located under the floor and configured to discharge an exhaust gas and water from the fuel cell; a muffler located below the fuel gas supply piping in a direction of gravity and connected with the exhaust drainage piping; and an undercover located below the muffler and provided to cover the floor, the undercover having a gap along a front-rear direction of the fuel cell vehicle formed between a front wheel of the fuel cell vehicle. The muffler is placed on any straight line that passes through the fuel gas supply pipe and that connects any point of a contact area in which the front wheel is in contact with ground surface with the gap in a view of a left-right direction of the fuel cell vehicle. In the fuel cell vehicle of this aspect, even when an object such as stone raised by the front wheel of the vehicle enters from the gap between the front wheel and the undercover, the muffler placed in the moving direction of the object suppresses the entering object from hitting against the fuel gas supply piping.

(2) The fuel cell vehicle of the above aspect may further include a reinforcement located under the floor and extended along the front-rear direction. The fuel gas supply piping may be located above a lower end of the reinforcement in the direction of gravity. Even when the fuel cell vehicle receives an impact from below, the fuel cell vehicle of this aspect causes the reinforcement to absorb the impact and thereby suppresses the fuel gas supply piping from being deformed.

(3) In the fuel cell vehicle of the above aspect, the undercover and the muffler may be fastened to each other. The fuel cell vehicle of this aspect includes the muffler and the undercover fastened to each other and thereby secures a route for the fuel gas supply piping.

(4) The fuel cell vehicle of the above aspect may further include an underbody located above the floor. The muffler may have a through hole that is pierced along the direction of gravity. A penetration collar may be placed in the through hole to fasten the undercover with the underbody. In the fuel cell vehicle of this aspect, the undercover and the underbody are securely fastened to each other by means of the penetration collar.

The present disclosure may be implemented by a variety of aspects, for example, a fuel system mounted on a vehicle.

What is claimed is:

1. A fuel cell vehicle equipped with a fuel cell, comprising:
   a fuel gas supply piping located under a floor of the fuel cell vehicle and configured to supply a fuel gas to the fuel cell;
   an exhaust drainage piping located under the floor and configured to discharge an exhaust gas and water from the fuel cell;
   a muffler located below the fuel gas supply piping in a direction of gravity and connected with the exhaust drainage piping; and
   an undercover located below the muffler and provided to cover the floor, the undercover having a gap along a front-rear direction of the fuel cell vehicle formed between a front wheel of the fuel cell vehicle and a front edge of the muffler, wherein
   the muffler is positioned below the fuel gas supply line such that any straight line starting at any point at which the front wheel is in contact with the ground surface and intersects with the gap will also intersect with the muffler when viewed from a transverse perspective.

2. The fuel cell vehicle according to claim 1, further comprising:
   a reinforcement located under the floor and extended along the front-rear direction, wherein
   the fuel gas supply piping is located above a lower end of the reinforcement in the direction of gravity.

3. The fuel cell vehicle according to claim 1, wherein the undercover and the muffler are fastened to each other.

4. The fuel cell vehicle according to claim 1, further comprising:
   an underbody located above the floor, wherein
   the muffler has a through hole that is pierced along the direction of gravity, and
   a penetration collar is placed in the through hole to fasten the undercover with the underbody.

* * * * *